United States Patent
Kapa, Jr. et al.

(10) Patent No.: US 9,620,171 B2
(45) Date of Patent: *Apr. 11, 2017

(54) RECORDED CONTENT REPAIR

(71) Applicant: EchoStar Technologies L.L.C., Englewood, CO (US)

(72) Inventors: Milton Kapa, Jr., Tucker, GA (US); Mark Wayne Lea, Keneesaw, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/137,471

(22) Filed: Dec. 20, 2013

(65) Prior Publication Data

US 2015/0179222 A1    Jun. 25, 2015

(51) Int. Cl.
*G11B 27/00* (2006.01)
*G11B 27/034* (2006.01)
*H04N 5/775* (2006.01)
*H04N 5/765* (2006.01)

(52) U.S. Cl.
CPC ........... *G11B 27/034* (2013.01); *H04N 5/765* (2013.01); *H04N 5/775* (2013.01)

(58) Field of Classification Search
CPC ... G11B 27/034; G11B 2220/90; G11B 27/34; G11B 27/105; H04N 9/8042
USPC ......................................... 386/278
See application file for complete search history.

(56) References Cited

U.S. PATENT DOCUMENTS

| | | | |
|---|---|---|---|
| 2004/0078624 A1* | 4/2004 | Maxemchuk | H04L 12/1868 714/4.2 |
| 2006/0165374 A1* | 7/2006 | Newton | G11B 27/034 386/228 |
| 2011/0019978 A1 | 1/2011 | Jagmag | |
| 2011/0026902 A1* | 2/2011 | Nguyen | H04N 5/76 386/295 |
| 2015/0071620 A1 | 3/2015 | Keohane | |
| 2015/0179221 A1 | 6/2015 | McCarthy | |

OTHER PUBLICATIONS

U.S. Appl. No. 14/137,408, filed Dec. 20, 2013, Non-Final Rejection mailed Oct. 26, 2015, 35 pages.

* cited by examiner

*Primary Examiner* — William C Vaughn, Jr.
*Assistant Examiner* — Daniel Tekle
(74) *Attorney, Agent, or Firm* — Kilpatrick Townsend & Stockton LLP

(57) ABSTRACT

A television receiver may detect at least one gap in content within an instance of recorded programming. The television receiver may send to a computer system a request to repair the at least one gap in content within the instance of recorded programming. The television receiver may receive one of content associated with the at least one gap in content, and a notification that indicates unavailability of content associated with the at least one gap in content. The television receiver may edit the instance of recorded programming to include content associated with the at least one gap in content when content associated with the at least one gap in content is received.

20 Claims, 8 Drawing Sheets

RECORDED CONTENT REPAIR

CROSS-REFERENCE TO RELATED APPLICATION

This application is related to U.S. Nonprovisional patent application Ser. No. 14/137,408, filed on even date herewith, entitled "RECORDED CONTENT REPAIR," the entirety of which is hereby incorporated by reference for all intents and purposes.

BACKGROUND

The advent of the digital video recorder and the availability of high-capacity and affordable computer-readable storage devices have made available many possibilities to television programming service providers and viewers alike. In addition, television viewers have come to expect flexibility and reliability with respect to the recording and accessing of recorded content via their television receivers.

SUMMARY

This Summary does not in any way limit the scope of the claimed subject matter.

In an aspect, a method may include or comprise detecting, by a television receiver, at least one gap in content within an instance of recorded programming. The method may include or comprise sending, by the television receiver to a computer system, a request to repair the at least one gap in content within the instance of recorded programming. The method may include or comprise receiving, by the television receiver, one of content associated with the at least one gap in content, and a notification that indicates unavailability of content associated with the at least one gap in content. The method may include or comprise editing, by the television receiver, the instance of recorded programming to include content associated with the at least one gap in content when content associated with the at least one gap in content is received.

In an aspect, a television receiver may include or comprise one or more processors; and a memory communicatively coupled with and readable by the one or more processors and having stored therein processor-readable instructions. The processor-readable instructions when executed by the one or more processors may cause the one or more processors to send to a computer system a request to repair the at least one gap in content within an instance of recorded programming. The processor-readable instructions when executed by the one or more processors may cause the one or more processors to detect receipt of one of content associated with the at least one gap in content, and a notification that indicates unavailability of content associated with the at least one gap in content. The processor-readable instructions when executed by the one or more processors may cause the one or more processors to edit the instance of recorded programming to include content associated with the at least one gap in content when content associated with the at least one gap in content is received.

In an aspect, a method for repairing recorded media content may include or comprise sending, by a television receiver to a server system, a request to repair at least one gap in content within the instance of recorded programming, the request including a start time and an end time of the at least one gap in content, and an identifier of the recorded programming. The method may include or comprise receiving, by the television receiver, content associated with the at least one gap in content from at least one of the server system and at least one system other than the server system. The method may include or comprise editing, by the television receiver, the instance of recorded programming to include content associated with the at least one gap in content.

DETAILED DESCRIPTION

Figure 1:
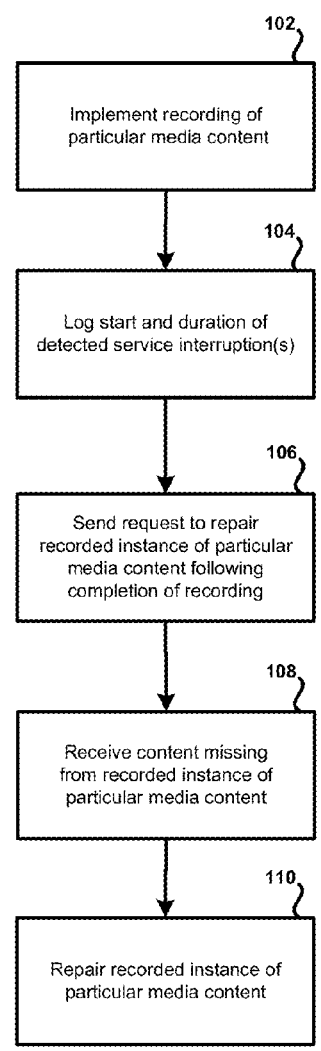
FIG. 1 shows a first example method in accordance with the disclosure.

The present disclosure is directed to or towards systems and methods for repairing recorded media content. In satellite television distribution systems it is not uncommon for signal tracking to be temporarily lost due to rain fade, or by some other mechanism. If certain programming is being recorded and signal tracking is lost, and then subsequently recovered, a gap would be present in that recording. This is an undesirable but generally unavoidable consequence of satellite television distribution systems. This and other issues are addressed or resolved by the various features or aspects of the present disclosure. For example, referring now to FIG. 1, a first example method 100 is shown in accordance with the disclosure.

The method 100 may include implementing (module 102), by a television receiver, a recording of particular content as received over a satellite communication connection or network. For example, the television receiver may detect activation of a recording timer to start the recording of a Movie A at a particular date/time. In this example, various resources of the television receiver may be allocated so as to enable the television receiver to tune to and record the Movie A as broadcast on a particular transponder of a particular satellite. Other embodiments are possible. For example, the recording of the Movie A may be instantiated by a manual process whereby a viewer interacts with a remote control in real-time to record the Movie A. In any case, it may beneficial for the television receiver to monitor the recording of the particular content as received over in satellite communication connection so that any content lost due to service interruption may be retrieved to repair the recording of the particular content.

For example, the method 100 may further include logging (module 104), by the television receiver, a start time, end time, and duration of a detected service interruption during the recording of the particular content. For example, the television receiver may detect during the recording of the Movie A that signal tracking is lost at a time T1 during that recording, and then recaptured at a time T2 following the time T1 during that recording. In general, the time T1 may be mapped to a certain time within the Movie A as measured from the beginning of that movie, such as precisely 5 minutes into the Movie A for example. Similarly, the time T2 may be mapped to a certain time within the Movie A as measured from the beginning of that movie, such as precisely 6 minutes into the Movie A for example. In these examples, a duration of the detected service interruption may be determined to be precisely 1 minute. Other examples are possible. For example, the "preciseness" of the measurement may be on the order of seconds, milliseconds, etc. Further, when there are multiple detected service interruptions during the recording of the Movie A, each respective event may be logged in a similar manner as described. Regardless though of whether there is one or many service interruptions during the recording particular content, it may beneficial for the television receiver to send a request to an external system to retrieve content lost due the service interruption, so that the television receiver may repair the recording of that content.

For example, the method 100 may further include sending (module 106), by the television receiver to a computer system over a terrestrial communication connection or network, a request to repair the recording of the particular content following completion of that recording. For example, the television receiver may initially detect expiration of the above-mentioned recording timer to terminate the recording of the Movie A, and then send the request in response to completion of the recording. In this example, the request may specify, among other information, the start time (e.g., T1), end time (e.g., T2), and duration (e.g., T2–T1) of the detected service interruption during the recording of the Movie A. In this manner, the computer system may determine or identify those portions or clips of content missing from the recording, and then implement an algorithm so that the television receiver may receive or retrieve that content determined absent from the recording. Subsequently, the computer system may coordinate various resources so that the television receiver may receive or retrieve content determined absent from a particular recording due to a service interruption.

For example, the method 100 may further include receiving (module 108), by the television receiver over a terrestrial communication connection or network, content corresponding to those portions or clips of content missing from the particular content due to the service detected service interruption. For example, the television receiver may receive, among other information, audio/video content corresponding to that within and including the time T1 that signal tracking was lost during the recording of the Movie A, and the time T2 that signal tracking was recaptured during that recording. In one embodiment, and as discussed throughout, that audio/video content may be received from the above-mentioned computer system itself, where the computer system may be associated with a particular satellite content provider. Other embodiments are possible. For example, that audio/video content may be received from at least one other, different television receiver that is associated with a particular customer of the particular satellite content provider. Here, the television receiver that receives the content corresponding to those portions or clips of content missing from the recording of the particular content due to the service detected service interruption may be associated with a different particular customer of the particular satellite content provider. Regardless of origination of the content used to repair the recording of the particular content, the television receiver following receipt of that content may repair the same.

For example, the method 100 may further include repairing (module 110), by the television receiver, the recording of the particular content as received over satellite connection. For example, the television receiver may insert the received audio/video content corresponding to that within and including the time T1 that signal tracking was lost during the recording of the Movie A, and the time T2 that signal tracking was recaptured during that recording. In this example, the recording of the Movie A may effectively be edited by the television receiver so that the gap in audio/video introduced by the detected service interruption during the recording of the Movie A is longer present.

It is contemplated that such an implementation as discussed in connection with FIG. 1 may be beneficial and/or advantageous in many respects. For example, providing a television receiver configured and arranged to repair recorded content as discussed throughout may serve to attract new customers and/or increase existing customer satisfaction and loyalty by reinforcing the idea that the television receiver may automatically detect service interruption events during the recording of content, and repair or restore corrupted content without requiring action to be taken by a customer. In another example, there may be a benefit to the service provider in using the content stored on customers DVRs for repair as it reduces the cost and work burden of maintaining an archive of content on their own servers. Further scenarios and beneficial aspects associated with repairing recorded media as discussed in the context of the present disclosure are described below.

Figure 2:
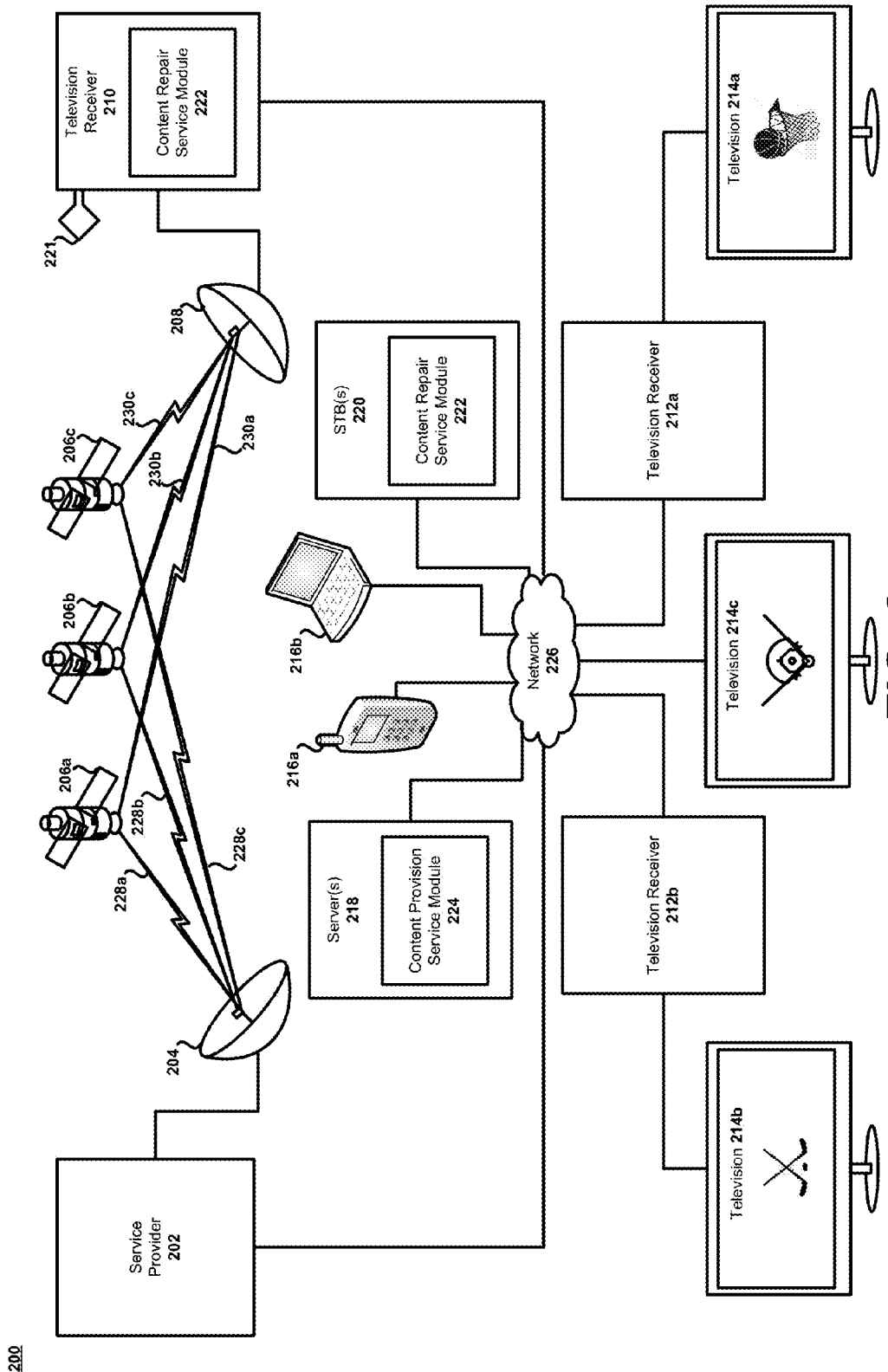
FIG. 2 shows an example satellite system in accordance with the disclosure.

FIG. 2 illustrates an example satellite television distribution system 200 in accordance with the present disclosure. For brevity, the system 200 is depicted in a simplified form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system as desired.

The example system 200 may include a service provider 202, a satellite uplink 204, a plurality of satellites 206a-c (e.g., in geosynchronous orbit), a satellite dish 208, a PTR (Primary Television Receiver) 210, a plurality of STRs (Secondary Television Receivers) 212a-b, a plurality of televisions 214a-c, a plurality of computing devices 216a-b, at least one server 218 that may be associated with the service provider 202, and at least one STB (Set-Top-Box) 220. Additionally, an OTA antenna 221 may be coupled to the PTR 210, and the PTR 210 and the STB 220 may include an instance of a content repair service module 222, and the server 218 may include an instance of a content provision service module 224. In general, the content repair service module 222 together or in tandem with the content provision service module 224 may be configured and arranged to implement various features associated recorded content repair as discussed in the context of the present disclosure. Such a solution may, among other things, attract new customers and increase existing customer satisfaction and loyalty by providing increased flexibility with respect to the accessing and recording of television programming. However, other benefits and/or advantages are possible as well, and an appreciation of such benefits and/or advantages may be understood in light of the present disclosure in its entirety.

The system 200 may further include at least one network 226 that establishes a bidirectional communication path for data transfer between and among each respective element of the system 200, outside or separate from the unidirectional satellite signaling path. The network 226 is intended to represent any number of terrestrial and/or non-terrestrial network features or elements. For example, the network 226 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 226, together with the STRs 212a-b and televisions 214a-c, and possibly the computing devices 216a-b, may each be incorporated within or form at least a portion of a particular home computing network. The STB 220 though may be incorporated within or form at least a portion of a different particular home computing network, yet be configured similar to the PTR 210 and/or STRs 212a-b. For example, the PTR 210 may be located within a first household A, whereas the STB 220 may be located within a different second household B. Here, the PTR 210 may be associated with a first customer of the service provider 202, and the STB 220 may be associated with a second different customer of the service provider 202.

Further, the PTR 210 and the STB 220 may each respectively be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still other embodiments are possible.

In practice, the satellites 206a-c may each be configured to receive uplink signals 228a-c from the satellite uplink 204. In this example, each the uplink signals 228a-c may contain one or more transponder streams of particular data or content, such as one or more particular television channels, as supplied by the service provider 202. For example, each of the respective uplink signals 228a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 228a-c to the satellite dish 208 as downlink signals 230a-c. Similar to the uplink signals 228a-c, each of the downlink signals 230a-c may contain one or more transponder streams of particular data or content, such as various encoded and/or at least partially electronically scrambled television channels, on-demand programming, etc., in accordance with an allotted carrier frequency and bandwidth. The downlink signals 230a-c, however, may not necessarily contain the same or similar content as a corresponding one of the uplink signals 228a-c. For example, the uplink signal 228a may include a first transponder stream containing at least a first group or grouping of television channels, and the downlink signal 230a may include a second transponder stream containing at least a second, different group or grouping of television channels. In other examples, the first and second group of television channels may have one or more television channels in common. In sum, there may be varying degrees of correlation between the uplink signals 228a-c and the downlink signals 230a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 230*a-c*, from one or more of the satellites 206*a-c*. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214*c* for display thereon. For example, the satellite dish 208 and the PTR 210 may, respectively, be configured to receive, decode, and relay at least one premium HD-formatted television channel to the television 214*c*. Programming or content associated with the HD channel may generally be presented live, or from a recording as previously stored on, by, or at the PTR 210. Here, the HD channel may be output to the television 214*c* in accordance with the HDMI/HDCP content protection technologies. Other embodiments are however possible.

Further, the PTR 210 may select via tuner, decode, and relay particular transponder streams to one or both of the STRs 212*a-b*, which may in turn relay particular transponder streams to a corresponding one of the televisions 214*a-b* for display thereon. For example, the satellite dish 208 and the PTR 210 may, respectively, be configured to receive, decode, and relay at least one television channel to the television 214*a* by way of the STR 212*a*. Similar to the above-example, the television channel may generally be presented live, or from a recording as previously stored on the PTR 210, and may be output to the television 214*a* by way of the STR 212*a* in accordance with a particular content protection technology and/or networking standard. Still further, the satellite dish 208 and the PTR 210 may, respectively, be configured to receive, decode, and relay at least one premium television channel to one or both of the computing devices 216*a-b*. Similar to the above-examples, the television channel may generally be presented live, or from a recording as previously stored on the PTR 210, and may be output to one or both of the computing devices 216*a-b* in accordance with a particular content protection technology and/or networking standard.

Figure 3:
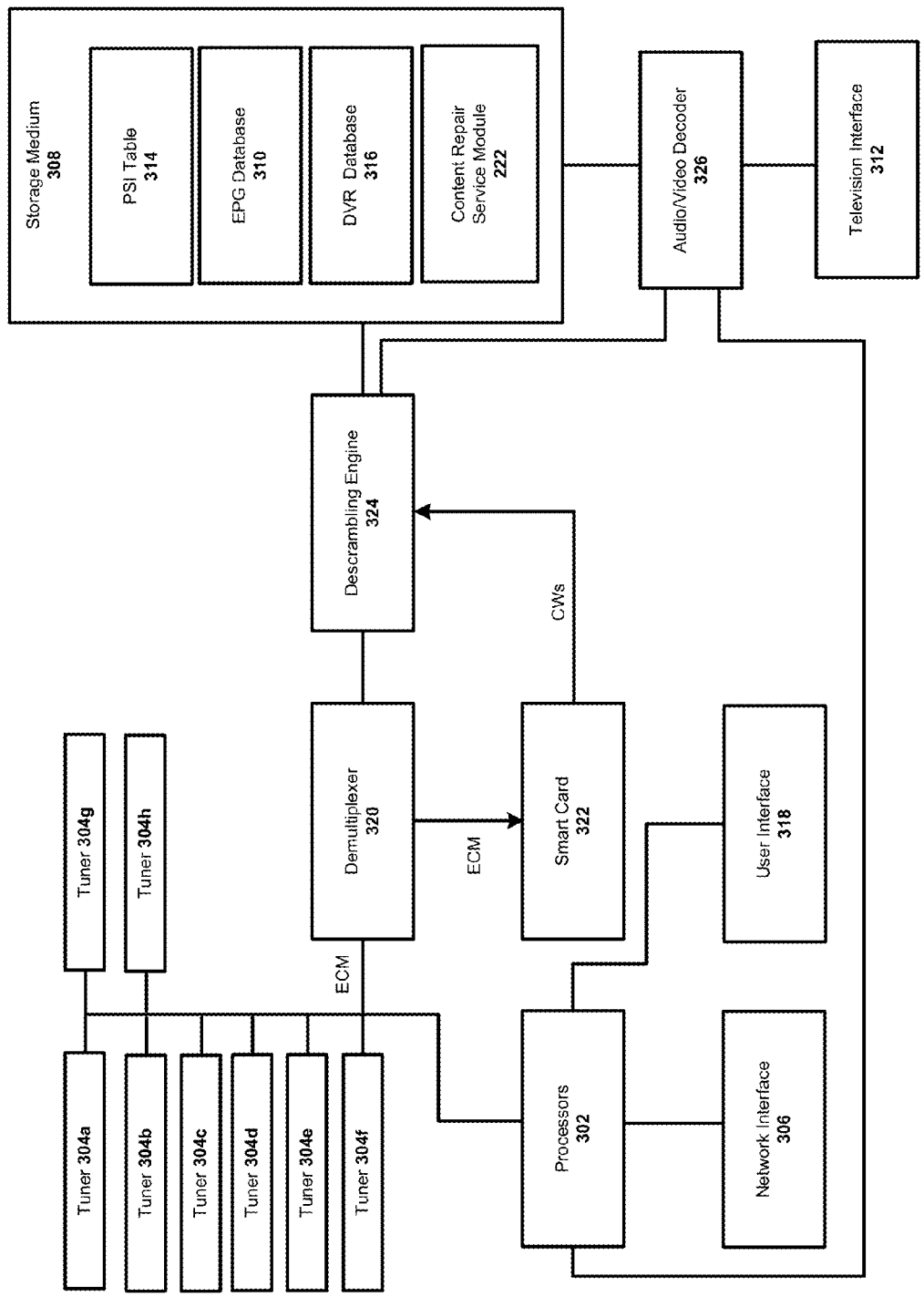
FIG. 3 shows an example block diagram of a television receiver of FIG. 1.

Referring now to FIG. 3, an example block diagram of the PTR 210 of FIG. 2 is shown in accordance with the present disclosure. In some embodiments, the STB 220 and at least one of the STRs 212*a-b* may be configured in a manner similar to that of the PTR 210. In some embodiment, one or more of the STRs 212*a-b* may be configured and arranged to exhibit a reduced functionality as compared to the PTR 210, and may depend at least to a certain degree on the PTR 210 to implement certain features or functionality. The STRs 212*a-b* in this example may be each referred to as a "thin client."

For brevity, the PTR 210 is depicted in a simplified form, and may generally include more or fewer elements or components as desired including those configured and/or arranged for repairing recorded media as discussed in the context of the present disclosure. For example, the PTR 210 is shown in FIG. 3 to include the content repair service module 222 as mentioned above in connection with FIG. 2. Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Referring still to FIG. 3, the PTR may include one or more processors 302, a plurality of tuners 304*a-h*, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other embodiments, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites 206*a-c*. Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206*a-c*, which may be unidirectional to the PTR 210, and an another communication channel between the service provider 202 and the PTR 210, which may be bidirectional, may be via the network 226. In general, various types of information may be transmitted and/or received via the network interface 206.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the content repair service module 222 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 226 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other embodiments, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4       | 1         | 2           | 27      | 2001       | 1011      |
| 5       | 2         | 11          | 29      | 2002       | 1012      |
| 7       | 2         | 3           | 31      | 2003       | 1013      |
| 13      | 2         | 4           | 33      | 2003, 2004 | 1013      |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 245 of storage medium 308. In some embodiments, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambles data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 260 may decrypt the ECM to obtain some number of control words. In some embodiments, from each ECM received by the smart card 322, two control words are obtained. In some embodiments, when the smart card 322 receives an ECM, it compares the ECM to the previously received ECM. If the two ECMs match, the second ECM is not decrypted because the same control words would be obtained. In other embodiments, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 255. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For simplicity, the PTR 210 of FIG. 3 has been reduced to a block diagram; common parts, such as a power supply for example, have been omitted. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules. Further, the components of the PTR 210 may be part of another device, such as built into a television. Also, while the PTR 210 may be used to receive, store, and present television channels received via a satellite, it should be understood that similar components may be used to receive, store, and present television channels via a cable network.

Figure 4:
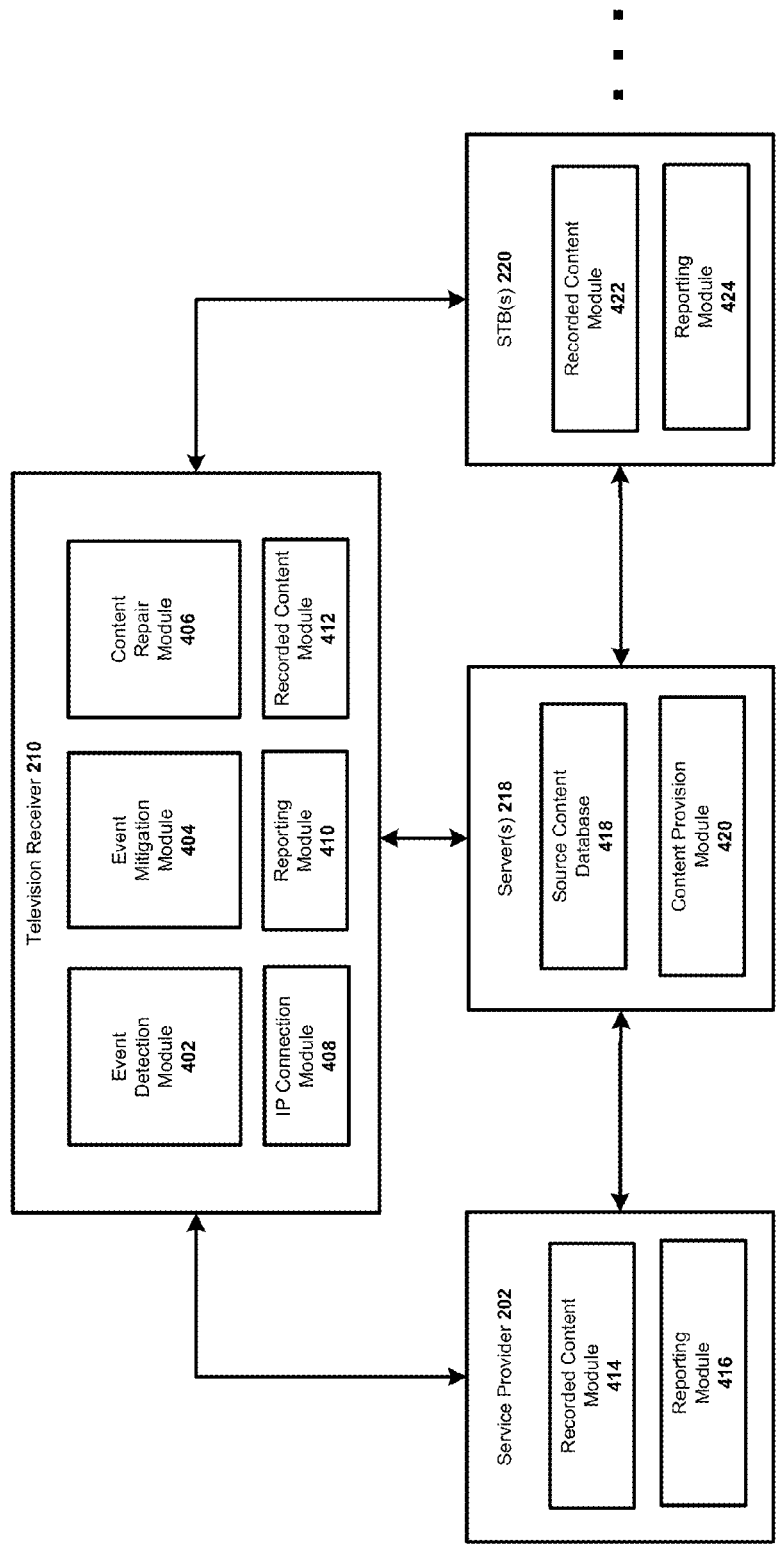
FIG. 4 shows aspects of the example satellite system of FIG. 1 in detail.

Referring now to FIG. 4, a block diagram 400 is shown illustrating particular components of the example system 200 of FIG. 2. More specifically, FIG. 4 shows a number of logical modules of the service provider 202, the PTR 210, the server 218, and the STB 220. For example, the PTR 210 may at least include an event detection module 402, an event mitigation module 404, a content repair module 406, an IP connection module 408, a local instance of a reporting module 410, and a local instance of a recorded content module 412. The service provider 202 may at least include a local instance of a recorded content module 414, and a local instance of a reporting module 416. The server 218 may at least include a source content database 418, and a content provision module 420. Last, the STB 220 may at least include a local instance of a recorded content module 422, and a local instance of a reporting module 424.

In the example embodiment, at least the event detection module 402, event mitigation module 404, content repair module 406, IP connection module 408, local instance of a reporting module 410, and local instance of a recorded content module 412 of the PTR 210 may correspond to or comprise the content repair service module 222 mentioned above. The STB 220 may be configured similar to the PTR 210, as discussed above. Further, at least the source content database 418 and content provision module 420 of the server 218 may correspond to or comprise the content provision service module 224 mentioned above. Other embodiments than that shown in FIG. 4 are however possible. For example, in some embodiments, one or more respective components of at least one of the PTR 210 and the server 218 as shown in FIG. 4 may be wholly or at least partially located on one or more other components of the example system 200. Still other embodiments are possible.

In practice, the event detection module 402 may monitor strength and/or quality of a signal received by the PTR 210 from one of the satellites 206a-c while the PTR 210 is, for example, recording particular content. In this example, a particular tuner of the PTR 210 may be allocated for this primary recording of the particular content. When the signal strength is determined by the event detection module 402 to be at or below a predetermined threshold value during the recording, the event detection module 402 may activate the event mitigation module 404 so that the event mitigation module 404 may seek an alternate source for the particular content. The event mitigation module 404 may ultimately acquire a secondary recording of the particular content so that, in event repair of the primary recording of the particular content by the content repair module 406 is unsuccessful, an option may be presented to user or viewer to access the secondary recording when desired. An example of such an implementation is discussed within related U.S. Nonprovisional patent application Ser. No. 14/137,408, filed on even date herewith, entitled "RECORDED CONTENT REPAIR," the entirety of which is hereby incorporated by reference for all intents and purposes.

Regardless though of whether or not the PTR 210 acquires two separate recordings of the particular content, the content repair module 406 may implement an algorithm to attempt to repair the primary recorded instance of the particular content when the PTR 210 determines that one or more gaps in the primary recording has or have occurred to due to one or more interruptions in satellite service during that recording. For example, the content repair module 406 may send a request, via the IP connection module 408, to the content provision module 420 of the server 218 to repair the primary recorded instance of the particular content following completion of that recording. In this example, the request may specify, among other information, the start time, end time, and duration of each particular service interruption detected by the event detection module 402 during the recording of the particular content. In response, the content provision module 420 may query the source content database 418 to determine an optimal solution for returning to the PTR 210 any portions or clips of the particular content that may have been lost due to signal loss or degradation as detected by the event detection module 402.

For example, the source content database 418 may specify in a table or list that the service provider 202 has direct access to all requested portions or clips of the particular content. In this example, the source content database 418 may acquire this information from the reporting module 416 of the service provider 202. Such information may be supplied to the source content database 418 from the reporting module 416 of the service provider 202 periodically, or at least intermittently, as part of one or both of a push process and a pull process. Regardless though of the mechanism used to populate the source content database 418 with information that specifies particular audio/video content directly accessible to or by the service provider 202, the content provision module 420 may coordinate communications between the service provider 202 and the PTR 210 so that the PTR 210 may acquire those requested portions or clips of the particular content directly from the service provider 202. For example, the content repair module 406 of the PTR 210 may receive requested content from or by way of the recorded content module 414 of the service provider 202 Other embodiments are possible.

For example, the source content database 418 may specify that the service provider 202 does not have direct access to any requested portions or clips of the particular content, but may specify that the STB 220 has direct, local access to all requested portions or clips of the particular content. In this example, the source content database 418 may acquire this information from the reporting module 424 of the STB 220. Such information may be supplied to the source content database 418 from the reporting module 424 of the STB 220 periodically, or at least intermittently, as part of one or both of a push and pull process. Regardless though of the mechanism used to populate the source content database 418 with information that specifies particular audio/video content directly accessible to or by the STB 220, the content provision module 420 may coordinate communications between the STB 220 and the PTR 210 so that the PTR 210 may acquire those requested portions or clips of the particular content directly from the STB 220. For example, the content repair module 406 of the PTR 210 may receive requested content or clips from or by way of the recorded content module 422 of the STB 220. Still other embodiments are possible.

For example, the source content database 418 may specify that the service provider 202 does have direct access to one or more, but not all, requested portions or clips of the particular content. In this example, the source content database 418 may specify that the STB 220 has direct, local access to those requested portions or clips of the particular content inaccessible to the service provider 202. The content provision module 420 may coordinate communications between the service provider 202 and the PTR 210, and the STB 220 and the PTR 210, so that the PTR 210 may acquire those requested portions or clips of the particular content directly from the service provider 202 and the STB 220, in a manner similar to that described above. Still other embodiments are possible.

For example, the source content database 418 may specify that the service provider 202 does have direct access to any requested portions or clips of the particular content, but may also specify that an STB 220(a) has direct, local access to one or more, but not all, of the requested portions or clips of the particular content inaccessible to the service provider 202, and that an STB 220(b) has direct, local access to remaining requested portions or clips of the particular content inaccessible to the STB 220(a). The "multiple" STBs in this scenario indicated by the " . . . " in FIG. 4. In this example, the content provision module 420 may coordinate communications between the STB 220(a) and the PTR 210, and the STB 220(b) and the PTR 210, so that the PTR 210 may acquire those requested portions or clips of the particular content directly from the STB 220(a) and the STB 220(b), in a manner similar to that described above. Still other embodiments are possible.

In any such scenario though, it is contemplated that the content repair module 406 may either entirely replace the primary recorded instance of the particular content, or directly repair those sections of the primary recorded instance of the particular content that may be absent or corrupt due to signal loss or degradation as detected by the event detection module 402. In general, that content may be received by the PTR 210 from any of a number of different sources such as described in connection with FIG. 4. With respect to the replacement of particular sections, or portions, or clips, of the particular content, those may effectively be edited by the PTR 210 so that any gaps in audio/video introduced by detected service interruptions during the recording of the particular content are longer present. Such an implementation as discussed in the context of FIG. 4 is described in further detail below in connection with at least FIG. 5.

Figure 5:
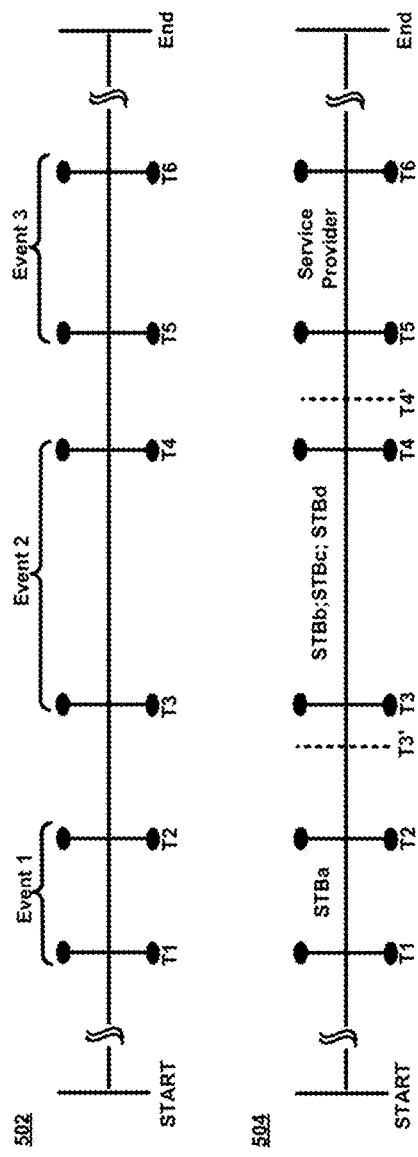
FIG. 5 shows a number of timelines in accordance with the disclosure.

For example, referring now to FIG. 5, a number of timelines are shown in accordance with the disclosure. More specifically, a first timeline 502 shows a number of gaps in or within an instance of particular recorded content. That content may comprise a particular movie, such as Movie A described above in connection with FIG. 1 for example. As shown by the first timeline 502, the instance of particular recorded content includes a START and an END. Also shown by the first timeline 502, the instance of particular recorded content includes a first gap, or Event 1, between and inclusive of time T1 and time T2, a second gap, or Event 2, between and inclusive of time T3 and time T4, and a third gap, or Event 3, between and inclusive of time T5 and time T6. Here, the instance of particular recorded content may be considered corrupted or corrupt, as multiple gaps are present where audio/video content is absent from the recording. If played-back, a blank screen might appear during the time period T3 to T4, for example, and audio would not be available for that time period as well.

A second timeline 504 shows the instance of particular recorded content in a repaired state. In general, repair of the instance of particular recorded content may occur in a manner similar to that described above in connection FIG. 4. In the present example, the audio/video content used to repair Event 1, between and inclusive of time T1 and time T2, is indicated as retrieved by the PTR 210 from a particular television receiver, STBa. In contrast, the audio/video content used to repair Event 2, between and inclusive of time T3 and time T4, is indicated as retrieved by the PTR 210 from a number of different television receivers, STBb; STBc; STBd. Further, the audio/video content used to repair Event 3, between and inclusive of time T5 and time T6, is indicated as retrieved by the PTR 210 from a service provider. In this manner, the instance of particular recorded content may be repaired from or by content received from any of a number of different sources, and further any particular clip of corrupted content may be replaced from content provided by any number of different sources. Further, it will be appreciated that any particular window of repaired content may be larger than an actual gap. For example, the audio/video content used to repair Event 2, between and inclusive of time T3 and time T4, may actually comprise audio/video content, between and inclusive of time T3' and time T4'. Other embodiments are possible.

Figure 6:
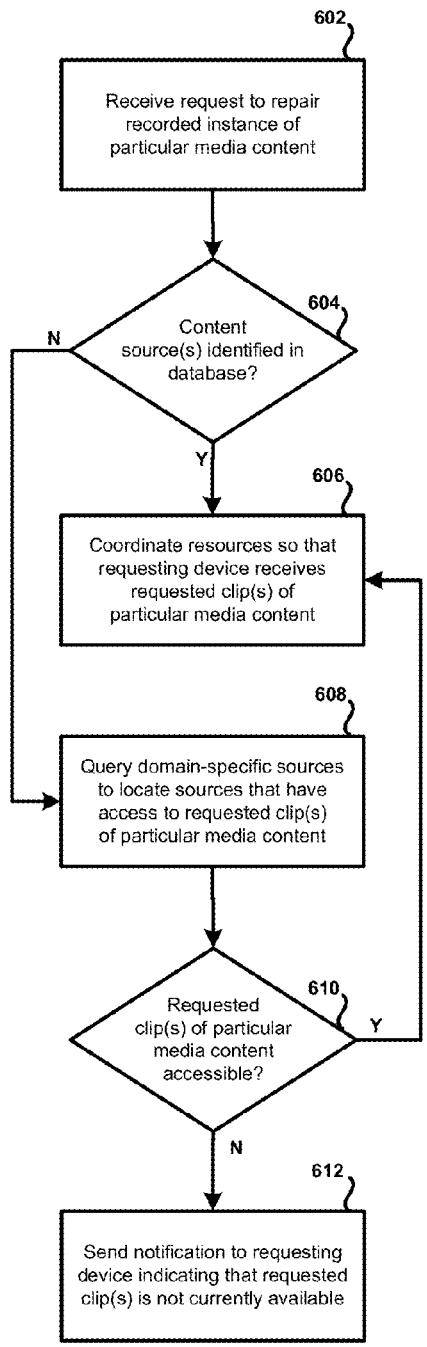
FIG. 6 shows a second example method in accordance with the disclosure.

Referring now to FIG. 6, a second example method 600 is shown in accordance with the disclosure. The various steps or modules of the example method 600 may be performed by the server 218 as discussed above. Other embodiments are however possible. For example, one or more various steps or modules of the example method 500 may be performed by one or more of the other elements of FIG. 2.

At step 602, the server 218 may receive a request to repair a recording of particular content. The request may specify, among other information, a requesting device (e.g., PTR 210), a content identifier (e.g. Movie A), a start time (e.g., T1), an end time (e.g., T2), and a duration (e.g., T2-T1) of a known or detected gap within the particular content. In this manner, the server 218 may determine or identify those portions or clips of content missing from the recording, and then implement an algorithm so that a requesting device may receive or retrieve that content determined absent from the recording.

At step 604, the server 218 may query the source content database 418 to determine whether the server 218 has knowledge of any sources that have access to requested portions or clips of the particular content. In this example, the source content database 418 may specify in a table, list, or the like, that one or more of the service provider 202 and the STB 220 has direct access to requested portions or clips of the particular content. In general, such information may be pushed to the source content database 418, or pulled to the source content database 418 by the server 218. For example, the service provider 202 and the STB 220 each may periodically, or at least intermittently, provide a report to the server 218 so that the server 218 is informed and up-to-date as to what content is accessible to the service provider 202 and the STB 220. In another example, the server 218 may query at least the service provider 202 and the STB 220 at a particular time so that the server 218 is informed and up-to-date as to what content is accessible to the service provider 202 and the STB 220.

Flow may proceed to step 606 when it is determined that the server 218 does have knowledge of one or more sources that has access to requested portions or clips of the particular content. At step 606, the server 218 may select a preferred source when multiple sources are identified. For, example, when both the service provider 202 and the STB 220 are identified as having access to requested portions or clips of the particular content, the server 218 may select the service provider 202 as a preferred source. This may be preferable because, for example, the service provider 202 may not have restrictions or limitations on network bandwidth usage, whereas the STB 220 may be tied to a customer account that does have restrictions or limitations on network bandwidth usage.

When a source is selected by the server 218, the content provision module 420 may coordinate communications between the selected source (e.g., service provider 202) and a requesting device (e.g., the PTR 210) so that the requesting device may acquire those requested portions or clips of the particular content directly from the selected source. In some embodiments, the server 218 may then update the source content database 418 to specify that the requesting device has a non-corrupted version of the particular media content, upon confirmation received by the server 218 that the recorded instance of the particular content on the requesting device has been successfully repaired.

In some embodiments, it may be likely that the service provider 202 and the STB 220 has a full recording of any particular content, as opposed to only a particular clip or portion of the particular content. In this manner, the service provider 202 and the STB 220 may source either a particular clip or portion of the particular content when requested, or possibly the particular content in its entirety when requested. It may be desirable though in some embodiments to only source a particular clip or portion of the particular content to save on bandwidth usage, etc.

Flow may proceed to step 608 when it is determined that the server 218 does not have knowledge of one or more sources that has access to requested portions or clips of the particular content. At step 608, the server 218 may query all known sources within a particular DMA (Designated Market Area) to identify any sources within the DMA that may have access to the requested portions or clips of the particular content. In many instances, particular content, such as a sitcom for example, may contain commercials or other content that intended to be accessible to only those sources within a particular DMA. In this manner, any prevailing rules or laws related to such content may be observed when the server 218 only queries those sources within the particular DMA. Other embodiments are however possible. For example, when particular content, such as movie for example, does not include commercials or any other content that intended to be accessible to only those sources within a particular DMA, the server 218 may query all known sources within any number of particular DMAs. It will be appreciated that the term "source" or "sources" may refer to any type of relevant computing system or device, and such a computing system or device is described in detail below in connection with FIG. 8.

At step 610, the server 218 may make a determination based on the query as to whether any particular sources within the particular DMA are identified as having access to the requested portions or clips of the particular content. Flow may proceed to step 606 when it is determined that the server 218 has identified one or more sources that has access to requested portions or clips of the particular content for further processing, similar to that discussed above. Flow may proceed to step 612 when it is determined that the server 218 has not identified one or more sources that has access to requested portions or clips of the particular content.

At step 612, the server 218 may send a notification to the requesting device indicating that the requested portions or clips of the particular content is or are not currently available. In some embodiments, the server 218 may receive at a later time another request to repair the recording of the particular content (step 602) based on the notification, where the requesting device may schedule in response to the notification transmission of another request so that the requesting device may continue to send requests to repair the recording of the particular content while the recording is known to be corrupt or incomplete by the requesting device.

Figure 7:
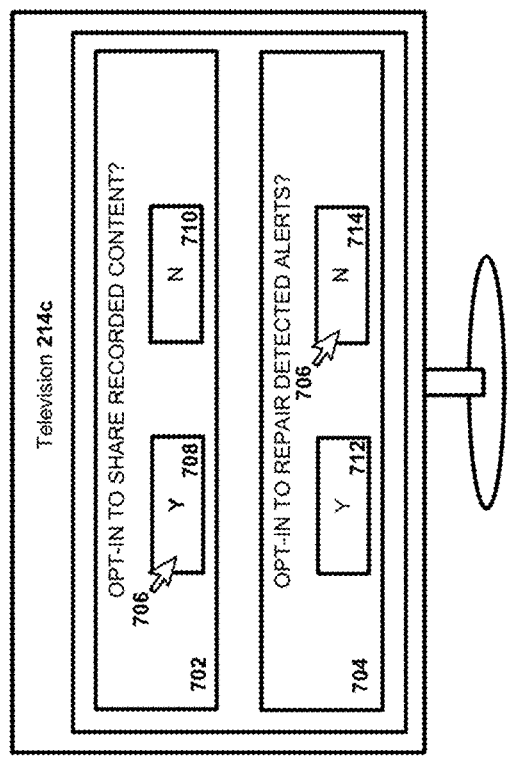
FIG. 7 shows a number of interfaces in accordance with the disclosure.

Referring now to FIG. 7, a number of interfaces are shown accordance with the disclosure. In particular, the PTR 210 may be configured to output at least a first interface 702 and a second interface 704 to and for presentation by at least the television 214c of FIG. 2. In this example, the first interface 702 shows an opt-in whereby a television viewer or customer of the content provider 202 may or may not "OPT-IN TO SHARE RECORDED CONTENT." Here, the viewer may manipulate a cursor 706 to select (e.g., "point and double-click") a Yes button 708 to opt-in to share recorded content with other customers of the content provider 202. The viewer may, for example, correspond to a customer of the content provider 202 that is associated with the STB 220 as discussed above, where portions or clips of particular content is supplied to the PTR 210 from the STB 220.

Alternatively, the viewer may manipulate a cursor 706 to select a No button 710 to opt-out from sharing recorded content with other customers of the content provider 202. The viewer may, for example, correspond to a customer of the content provider 202 that is associated with the STB 220 as discussed above. In this example though, the server 218 may determine that the STB 220 is not an option to source the portions or clips of the particular content to the PTR 210. Other embodiments are possible. For example, it is envisioned that any means consistent with menu-driven navigation may be used to interact with the first interface 702 (and second interface 704) as shown in FIG. 7.

The second interface 704 shows an opt-in whereby a television viewer or customer of the content provider 202 may or may not "OPT-IN TO REPAIR DETECTED ALERTS." Here, the viewer may manipulate the cursor 706 to select a Yes button 712 to opt-in to repair detected warnings or alerts that may be present within certain recorded content. Here, it is envisioned that an alert or warning, such as an Amber Alert, or a severe storm warning, may interrupt a recording of particular content when that alert or warning is broadcast during the recording.

This is similar to the "gap" in a recording that might occur due to loss and then return of satellite service, audio/video in contrast though is not absent during the gap. Rather, other audio/video, such as a loud tone followed by a "breaking news report," for example, may replace audio/video of particular content that is being recorded. It is contemplated that the PTR 210 may detect this gap by analyzing characteristics or features of the particular content that is being recorded to identify, for example, a loud tone or underlying metadata that might be embedded within the recording. In turn, this information may be used by the PTR 210 to determine a start time, end time, and duration of the gap, and then proceed to attempt to repair the gap in a manner as discussed throughout. Alternatively, the viewer may manipulate the cursor 706 to select a No button 714 to opt-out from repairing detected warnings or alerts that may be present within certain recorded content. Other embodiments are possible. For example, in some embodiments, instead of relying on the PTR 210 to repair recorded media content, a "button" or "icon" may be provided within an EPG for example where a user could manually select the button or icon to make a request for a repaired version. The content may then repaired possibly in a manner similar to that as discussed throughout.

Figure 8:
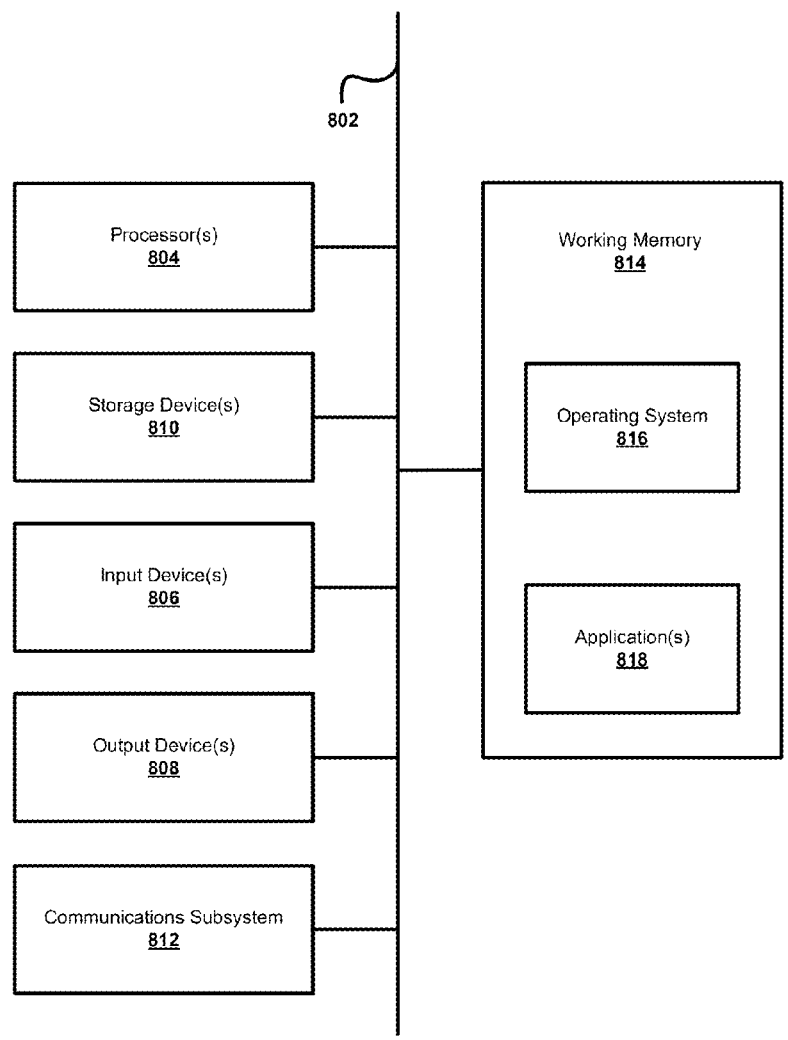
FIG. 8 shows an example computing system or device.

FIG. 8 shows an example computer system or device 800 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 2. In this manner, any of one or more of the respective elements of at least FIG. 2 may be configured to perform and/or include instructions that, when executed, perform the method of FIG. 1 and/or the method of FIG. 6. Still further, any of one or more of the respective elements of at least FIG. 2 may be configured to perform and/or include instructions that, when executed, instantiate and implement functionality of the PTR 210, the server 218 and/or the STB 220.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, by a television receiver from a service provider, a transmission corresponding to an instance of television programming;
   monitoring, by the television receiver, signal strength or signal quality of the received transmission;
   determining that the signal strength or signal quality of the received transmission falls at or below a predetermined threshold value during the instance of television programming;
   storing, by the television receiver, the instance of television programming to a storage device, thereby generating an instance of recorded programming;
   detecting, by the television receiver, a gap in content within the instance of recorded programming corresponding to the signal strength or signal quality of the received transmission falling at or below the predetermined threshold value during the instance of television programming, wherein detecting includes identifying a start time and an end time of the gap in content;
   transmitting, by the television receiver to a remote server associated with the service provider using a terrestrial network connection, a request for additional content to repair the gap in content within the instance of recorded programming, wherein the request includes the start time and the end time of the gap in content;
   receiving, by the television receiver using the terrestrial network connection, additional content associated with the gap in content;
   editing, by the television receiver, the instance of recorded programming to include the additional content associated with the gap in content, wherein the editing includes inserting the additional content between the start time and the end time of the gap in content;
   analyzing, by the television receiver, the instance of television programming to identify an alert or warning that replaces audio, or video, or both audio and video of the television programming;
   transmitting, by the television receiver, using a terrestrial network connection and to the remote server associated with the service provider, a request for replacement content to replace the alert or warning in the instance of recorded programming, wherein the request includes the start time and the end time of the alert or warning
   receiving, by the television receiver using the terrestrial network connection, replacement content associated with the alert or warning; and
   editing, by the television receiver, the instance of recorded programming to insert the replacement content in place of the alert or warning.

2. The method of claim 1, further comprising determining an identifier of the instance of recorded programming, and transmitting the identifier with the request for additional content to repair the gap in content within the instance of recorded programming.

3. The method of claim 1, further comprising:
   receiving, by the television receiver, input corresponding to authorization to replace alerts or warnings in recorded content with replacement content.

4. The method of claim 1, wherein receiving the transmission corresponding to the instance of television programming includes receiving the transmission over a satellite network.

5. The method of claim 1, wherein receiving the transmission corresponding to the instance of television programming includes receiving the transmission over a terrestrial network.

6. The method of claim 1, wherein receiving the additional content includes receiving a first portion of the additional content from the service provider and receiving a second portion of the additional content from a remote television receiver.

7. The method of claim 1, wherein analyzing the instance of recorded programming to identify an alert or warning in the instance of recorded programming includes analyzing audio or metadata embedded within the instance of television programming to identify the alert or warning.

8. The method of claim 1, wherein the additional content associated with the gap in content is of greater duration than the gap in content.

9. The method of claim 1, further comprising:
   receiving a notification that indicates unavailability of content associated with the gap in content, and
   transmitting another request for additional content to repair the gap in content within the instance of recorded programming following passage of a predetermined period of time after receiving the notification.

10. The method of claim 1, further comprising:
    receiving, by the television receiver, input corresponding to authorization to share recorded content stored on the storage device with other television receivers for purposes of repairing detected gaps in content by the other television receivers;
    receiving, by the television receiver using the terrestrial network connection, a request for a portion of the recorded content; and
    transmitting, by the television receiver using the terrestrial network connection, the portion of the recorded content.

11. The method of claim 1, further comprising:
generating, by the television receiver, a list or report identifying recorded content stored on the storage device; and
transmitting, by the television receiver, the list or report to the remote server associated with the service provider using a terrestrial network connection.

12. A television receiver, comprising:
one or more processors; and
a memory communicatively coupled with and readable by the one or more processors and having stored therein processor-readable instructions that, when executed by the one or more processors, cause the one or more processors to perform operations including:
receiving, from a service provider, a transmission corresponding to an instance of television programming;
monitoring signal strength or signal quality of the received transmission;
determining that the signal strength or signal quality of the received transmission falls at or below a predetermined threshold value during the instance of television programming;
storing the instance of television programming to a storage device, thereby generating an instance of recorded programming;
detecting a gap in content within the instance of recorded programming corresponding to the signal strength or signal quality of the received transmission falling at or below the predetermined threshold value during the instance of television programming, wherein detecting includes identifying a start time and an end time of the gap in content;
transmitting, to a remote server associated with the service provider using a terrestrial network connection, a request for additional content to repair the gap in content within the instance of recorded programming, wherein the request includes the start time and the end time of the gap in content;
receiving, using the terrestrial network connection, additional content associated with the gap in content;
editing the instance of recorded programming to include the additional content associated with the gap in content, wherein editing includes inserting the additional content between the start time and the end time of the gap in content;
analyzing the instance of television programming to identify an alert or warning that replaces audio, or video, or both audio and video of the television programming;
transmitting, using a terrestrial network connection and to the remote server associated with the service provider, a request for replacement content to replace the alert or warning in the instance of recorded programming, wherein the request includes the start time and the end time of the alert or warning;
receiving, using the terrestrial network connection, replacement content associated with the alert or warning; and
editing the instance of recorded programming to insert the replacement content associated in place of the alert or warning.

13. The television receiver of claim 12, wherein the operations further include:
detecting an identifier of the instance of recorded programming and transmitting the identifier with the request for additional content to repair the gap in content within the instance of recorded programming.

14. The television receiver of claim 12, wherein the operations further include:
receiving input corresponding to authorization to replace alerts or warnings in recorded content with replacement content.

15. The television receiver of claim 12, wherein receiving the transmission corresponding to the instance of television programming includes receiving the transmission over a satellite network.

16. The television receiver of claim 12, wherein receiving the transmission corresponding to the instance of television programming includes receiving the transmission over a terrestrial network.

17. The television receiver of claim 12, wherein the operations further include:
receiving a notification that indicates unavailability of content associated with the gap in content, and
transmitting another request for additional content to repair the gap in content within the instance of recorded programming following passage of a predetermined period of time after receiving the notification.

18. The television receiver of claim 12, wherein the operations further include:
generating a list or report identifying recorded content stored on the storage device; and
transmitting the list or report to the remote server associated with the service provider using a terrestrial network connection.

19. The television receiver of claim 12, wherein the operations further include:
receiving input corresponding to authorization to share recorded content stored on the storage device with other television receivers for purposes of repairing detected gaps in content by the other television receivers;
receiving a request for a portion of the recorded content using the terrestrial network connection; and
transmitting the portion of the recorded content using the terrestrial network connection.

20. A non-transitory processor-readable medium comprising instructions that, when executed by one or more processors, cause the one or more processors to perform operations including:
receiving, from a service provider, a transmission corresponding to an instance of television programming;
monitoring signal strength or signal quality of the received transmission;
determining that the signal strength or signal quality of the received transmission falls at or below a predetermined threshold value during the instance of television programming;
storing the instance of television programming to a storage device, thereby generating an instance of recorded programming;
detecting a gap in content within the instance of recorded programming corresponding to the signal strength or signal quality of the received transmission falling at or below the predetermined threshold value during the instance of television programming, wherein detecting includes identifying a start time and an end time of the gap in content;
transmitting, to remote server associated with the service provider using a terrestrial network connection, a request for additional content to repair the gap in content within the instance of recorded programming, wherein the request includes the start time and the end time of the gap in content;

receiving, using the terrestrial network connection, additional content associated with the gap in content;

editing the instance of recorded programming to include the additional content associated with the gap in content, wherein the editing includes inserting the additional content between the start time and the end time of the gap in content;

analyzing the instance of television programming to identify an alert or warning that replaces audio, or video, or both audio and video of the television programming;

transmitting, using a terrestrial network connection and to the remote server associated with the service provider, a request for replacement content to replace the alert or warning in the instance of recorded programming, wherein the request includes the start time and the end time of the alert or warning;

receiving, using the terrestrial network connection, replacement content associated with the alert or warning; and editing the instance of recorded programming to insert the replacement content associated in place of the alert or warning.

* * * * *